No. 769,697.  
Patented September 13, 1904.

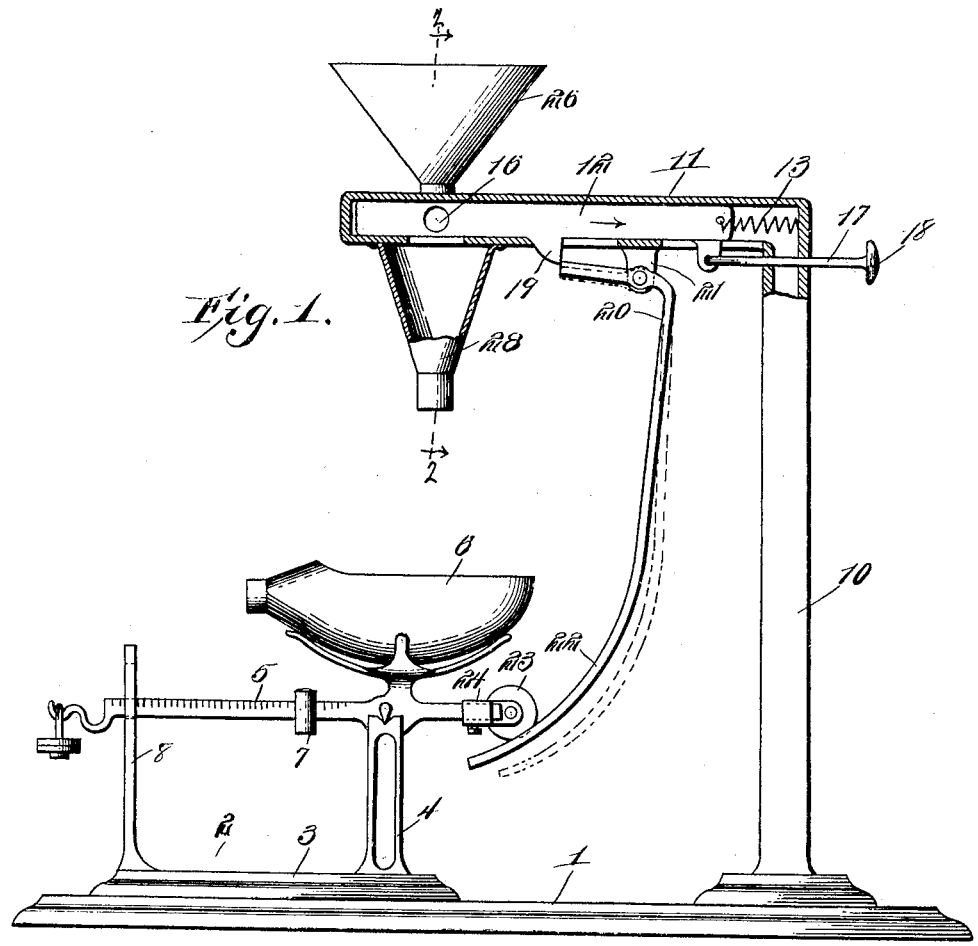

UNITED STATES PATENT OFFICE.

JAMES T. JORDAN, OF SAN ANTONIO, TEXAS.

SELF-MEASURING SCALE.

SPECIFICATION forming part of Letters Patent No. 769,697, dated September 13, 1904.

Application filed October 20, 1903. Serial No. 177,792. (No model.)

*To all whom it may concern:*

Be it known that I, JAMES T. JORDAN, a citizen of the United States, residing at San Antonio, in the county of Bexar and State of Texas, have invented a new and useful Self-Measuring Scale, of which the following is a specification.

This invention relates to self-measuring scales; and the object of the invention is to provide an improved form of scale for use by grocers and others, by which the amount of material required to balance the weight on the scale-beam may be automatically determined, thus making the operation of weighing a specified amount of material much quicker and easier of accomplishment than with the ordinary scales.

The operation of weighing dry materials in groceries and other stores is, as is well known, ordinarily performed by setting the desired weight upon one side of the scale-pivot and then introducing the material to be weighed into the pan on the other side of the scale-pivot by means of a scoop or other similar implement. In weighing in this manner an attempt is made to introduce into the pan of the scale at first an amount approximately equal in weight to the weight on the other side of the scale-pivot, and if the weight of the material introduced into the scale-pan is too small additional amounts will be added gradually to make the material in the scale-pan balance exactly the weight on the other side of the scale-pivot. In gradually increasing the amount of the material in the scale-pan the desired amount is frequently exceeded and it becomes necessary to remove a portion of the material from the scale-pan in order to obtain an exact balance. As considerable time is usually required by this method of gradually introducing additional material into the scale-pan to obtain exactly the desired weight, the ordinary course of procedure is to introduce enough material to barely overbalance the weight on the opposite side of the scale-pivot, and unless the excess of weight in the scale-pan is considerable none of the material is removed in order to obtain an exact balance, the loss of time required in weighing exactly being regarded as greater than the loss of the material by giving slight overweights. However slight the overweight given at each transaction the total amount within the year will be so great as to represent a very material loss, and it is extremely desirable to have scales of such construction that the giving of overweights may be positively prevented and the time required for the weighing operation shortened.

In the attainment of the object above mentioned and other minor objects, which will appear as the invention is more fully disclosed, I make use of the novel construction and combination of parts of a self-measuring scale hereinafter fully described, illustrated in the accompanying drawings, and particularly specified in the appended claims.

In the drawings, Figure 1 is a view, partly in side elevation and partly in section, of the complete self-measuring scale. Fig. 2 is a view, partly in side elevation and partly in section, on the line 2 2 of Fig. 1 looking in the direction indicated. Fig. 3 is a view in horizontal section through the supporting-arm of a modified form of the invention.

Referring to the drawings, in which corresponding parts are designated by similar characters of reference throughout, 1 designates a base of any suitable material, upon which is mounted an ordinary grocer's scale, preferably of the type in which a pivot-beam, a counterweight slidably mounted on the beam, and a pan to receive the material to be weighed form the essential elements. The scale shown in the present instance includes a supporting structure 2, comprising a bottom frame 3 and pillar 4, on the upper end of which a scale-beam 5 is balanced, a scale-pan 6, supported on the beam, a counterweight 7, slidably mounted on the graduated portion of the beam, and a member 8, having a slot in which the beam rocks.

At one end of the base there is rigidly mounted an upright or standard 10, having at its top a horizontally-disposed arm 11, which extends over the scale-pan. The arm 11 is preferably of the form shown and has in its interior a slide 12, which is normally drawn by a spring 13 toward the standard 10. The arm 11 is also provided on one side with an opening 14, which extends transversely through a portion of the arm and merges into a chamber 15 on the under side of the arm. The slide 12 is also provided with an opening 16 of the same diameter as the opening 14 in the arm, and when the slide 12 is moved away from its normal position and forced against the tension of the spring 13 to the limit of its movement away from the standard 10 the openings 14 and 16 will be in registration. In order to push the slide 12 outward against the tension of spring 13, a rod 17 is slidably mounted in the upper end of the standard 10 and rigidly connected at one end with the slide 12, while its other end projects through the standard 10 and is provided with a knob 18 to afford means for conveniently grasping the rod. The slide 12 is also provided with a downwardly-extending lug 19, which is adapted to engage when the opening in the slide registers with the opening 14 with one end of a swinging member 20, which is pivotally supported in a bracket 21, attached to the under side of the arm 11. The member 20 consists, preferably, of a rod bent at right angles near one end and having the shorter portion pivotally secured in the bracket 21, as shown, while the longer portion extends downwardly almost to the base 1. The longer portion of the member 20 has attached thereto, near its lower end, a curved arm 22, which extends beneath the scale-pan and is adapted to contact with a grooved roll 23, rotatably mounted in a bracket 24, which is adjustably mounted on the end of the scale-beam.

When the slide 12 is pushed away from the standard until the opening 16 registers with the opening 14, the shorter portion of the member 20 may be turned upward sufficiently to bring the end thereof into engagement with the lug 19, and the slide 12 will so be held out of its normal position until the member 20 is thrown out of engagement with the lug 19. When the member 20 is in engagement with the lug 19, the arm 22 will lie in contact with the roll 23, and the scale-pan 6 will be raised and the counterweight 7 depressed. Now when material to be weighed is introduced into the scale-pan in sufficient quantity to overbalance the counterweight the scale-pan will descend, and the roll 23, acting upon the curved arm 22, will force said arm into the position indicated in dotted lines in Fig. 1, and so swing the member 20 a sufficient distance to disengage the member 20 and the lug 19. As soon as the member 20 and lug 19 are thrown out of engagement the spring 13 will act to return the slide 12 to its normal position, and the openings 14 and 16 will no longer be in registration.

The operation described in the foregoing paragraphs is made use of in effecting automatic measurements of materials to be weighed by providing a hopper 26 with an elbow 27 at the lower end, which is inserted into the opening 14 in the arm 11, and a funnel 28, which is secured to the under side of the arm 11 just below the chamber 15. The material to be weighed is then introduced into the hopper 26, the scale having been previously set to weigh the desired amount and the slide 12 having been moved away from its normal position to bring the opening therein into registration with the opening 14 in the arm 11. The material fed into the hopper 26 will of course pass downward under the influence of gravity and will be guided into the scale-pan by means of the curved top of the chamber 15 and the funnel 28. As soon as the amount of material required has entered the scale-pan the latter will descend, carrying with it the roll 23, which engages with the curved arm 22. The descent of the roll 23 will swing the member 20 into the position shown in dotted lines in Fig. 1, and consequently release the lug 19 from engagement with the upper end of the member 20, allowing the slide to be returned to its normal position by the action of the spring 13. As soon as the slide 12 is returned to its normal position the passage of material through the opening 14 will be cut off, and the weight in the scale-pan will not be increased beyond the desired amount.

From the foregoing explanation of the operation of the self-measuring scale it will be apparent that the amount of material which enters the pan will be determined by the position of the weight 7 upon the scale-beam, and by setting the weight at any desired point the material which will be allowed to enter the scale-pan will be positively limited. Inasmuch as the material which has passed through the opening 16 in the slide 12, but has not reached the scale-pan at the time of its descent, will fall into the scale-pan after the slide has been released and the flow of material through the opening 14 cut off, it will be necessary to arrange the parts of the apparatus so that the scale-pan will be depressed by a weight slightly less than that which is to be introduced into the scale-pan; otherwise there would be a loss on every sale of material weighed by the apparatus. The adjustment of the parts to cause the scale-pan to descend at just the right moment may, however, be easily effected and the apparatus so arranged that the slide 12 will cut off the flow of material to the scale-pan when exactly the right amount of material has passed through the opening in the slide.

After each weighing any excess of material remaining in the hopper 26 will be removed by being allowed to pass downward through the funnel 28 into a suitable receiver after the slide has been returned to position for another weighing. Consequently, as soon as the material has been removed from the hopper 26 the apparatus will be ready for another operation.

In Fig. 3 there is shown a modified form of the invention in which the slide 12 is replaced by a slide 30, disposed in a horizontal plane, and the hopper 26 is replaced by a hopper 31, which fits directly into an opening in the top of the arm 32. The other parts of the apparatus used in connection with these modified structures are substantially the same as those already described and further description and illustration thereof appear to be unnecessary.

In the modified form of the apparatus the action is substantially the same as that of the preferred form; but the rate at which the material will pass from the hopper to the scale-pan will be more rapid, and consequently the modified form of the apparatus is better adapted for use with some kinds of material than the form of apparatus first described.

While I have shown and described the preferred forms of the embodiment of my invention, it will be obvious that various modifications in the details of construction may be resorted to without departing from the spirit of the invention or sacrificing its advantages.

Having thus described the nature and use of my invention, what I claim as new, and desire to secure by Letters Patent, is—

1. The combination with a scale comprising a scale-pan and a supporting member, of means for feeding material into said pan, automatic mechanism for cutting off the feed of material, and a latch adapted to hold said cut-off mechanism in inoperative position, said latch having an arm extended beneath the scale-pan-supporting member in position to be engaged thereby when the scale-pan descends.

2. The combination with a scale comprising a pivot-beam and a pan carried thereby, of means for feeding material into said pan, cut-off mechanism, a pivoted releasing member for said cut-off mechanism disposed adjacent to said beam, and a roll on said beam which is brought into engagement with said releasing member when the pan descends.

3. The combination with a scale comprising a pivot-beam and a pan carried thereby, of a spring-actuated cut-off, a lug mounted on said cut-off, a pivoted member to engage said lug and hold said cut-off in inoperative position, and an arm associated with said member and disposed adjacent to said beam, and adapted to be engaged by said beam when the pan descends to throw said member out of engagement with said lug.

4. The combination with a scale comprising a scale-pan and supporting member, of means for feeding material into said pan, a spring-actuated cut-off slide, and a pivoted latch adapted to engage said slide to hold it in inoperative position, said latch having a curved arm extending downward and beneath said scale-pan-supporting member in position to be engaged thereby when the scale-pan descends.

In testimony that I claim the foregoing as my own I have hereto affixed my signature in the presence of two witnesses.

JAMES T. JORDAN.

Witnesses:
J. W. VANHAM,
A. R. MAURER.